United States Patent
Tanaka et al.

(10) Patent No.: US 11,206,083 B2
(45) Date of Patent: Dec. 21, 2021

(54) ON-VEHICLE COMMUNICATION SYSTEM

(71) Applicant: SUMITOMO ELECTRIC INDUSTRIES, LTD., Osaka (JP)

(72) Inventors: Yuya Tanaka, Osaka (JP); Koichi Takayama, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/769,193

(22) PCT Filed: Aug. 9, 2018

(86) PCT No.: PCT/JP2018/029962
§ 371 (c)(1),
(2) Date: Jun. 2, 2020

(87) PCT Pub. No.: WO2019/111447
PCT Pub. Date: Jun. 13, 2019

(65) Prior Publication Data
US 2020/0374007 A1 Nov. 26, 2020

(30) Foreign Application Priority Data
Dec. 7, 2017 (JP) .............................. JP2017-235000

(51) Int. Cl.
| | | |
|---|---|---|
| H04B 10/00 | (2013.01) |
| H04B 10/25 | (2013.01) |
| H04L 12/28 | (2006.01) |
| H04J 14/00 | (2006.01) |

(52) U.S. Cl.
CPC ............. *H04B 10/25* (2013.01); *H04L 12/28* (2013.01)

(58) Field of Classification Search
CPC .... H04B 10/27; H04B 10/272; H04B 10/275; H04B 10/278; B60R 16/023; B60R 16/0231; B60R 16/0232; H04L 2012/40267; H04L 2012/40237;
(Continued)

(56) References Cited

U.S. PATENT DOCUMENTS

| | | | | |
|---|---|---|---|---|
| 2002/0089725 A1* | 7/2002 | Farmer | ............... | H04J 14/0232 398/167.5 |
| 2007/0140258 A1* | 6/2007 | Tan | ....................... | H04J 3/1694 370/395.21 |
| 2008/0273601 A1 | 11/2008 | Cowdery | | |

(Continued)

FOREIGN PATENT DOCUMENTS

| | | |
|---|---|---|
| CN | 1961534 A | 5/2007 |
| CN | 103434461 A | 12/2013 |

(Continued)

OTHER PUBLICATIONS www.m-w.com; definition of "motor vehicle"; retrieved Jun. 22, 2021 (Year: 2021).*

(Continued)

*Primary Examiner* — Daniel G Dobson
(74) *Attorney, Agent, or Firm* — Oliff PLC

(57) ABSTRACT

An on-vehicle communication system mounted on a vehicle is provided with a master function unit and a plurality of slave function units. The plurality of slave function units are able to transmit uplink communication signals to the master function unit via at least a common optical fiber.

10 Claims, 11 Drawing Sheets

(58) Field of Classification Search
CPC ... H04L 2012/4028; H04L 2012/40286; H04L 2012/40293
See application file for complete search history.

(56) References Cited

U.S. PATENT DOCUMENTS

| | | | |
|---|---|---|---|
| 2011/0320549 A1* | 12/2011 | Ohyama | H04L 67/18 709/206 |
| 2012/0045199 A1 | 2/2012 | Sun et al. | |
| 2012/0063774 A1 | 3/2012 | Niibe et al. | |
| 2015/0037035 A1* | 2/2015 | Sugawa | H04J 14/0238 398/66 |

FOREIGN PATENT DOCUMENTS

| | | |
|---|---|---|
| JP | H08-163144 A | 6/1996 |
| JP | 2006-313955 A | 11/2006 |
| JP | 2010-173366 A | 8/2010 |
| JP | 2012-060503 A | 3/2012 |
| JP | 2012-526421 A | 10/2012 |
| JP | 2014-046748 A | 3/2014 |

OTHER PUBLICATIONS www.m-w.com; definition of "sensor"; retrieved Jun. 22, 2021 (Year: 2021).*

\* cited by examiner

FIG. 8

| DRIVING MODE | ENVIRONMENT/TRAVELING PLACE | CAMERA 201D | CAMERA 201E | LiDAR 201A | LiDAR 201B | MILLIMETER-WAVE SENSOR | TCU 201F |
|---|---|---|---|---|---|---|---|
| AUTOMATED DRIVING MODE | DAYTIME/ ORDINARY ROAD | 35% | 35% | 10% | 10% | 5% | 5% |
| AUTOMATED DRIVING MODE | NIGHTTIME/ ORDINARY ROAD | 15% | 15% | 25% | 25% | 15% | 5% |
| AUTOMATED DRIVING MODE | DAYTIME/ EXPRESSWAY | 30% | 30% | 5% | 5% | 5% | 25% |
| AUTOMATED DRIVING MODE | DAYTIME/EXPRESSWAY/ WITHOUT FOLLOWING VEHICLE | 30% | 10% | 5% | 2% | 5% | 48% |
| MANUAL MODE |  | 10% | 10% | 5% | 5% | 5% | 65% |

ON-VEHICLE COMMUNICATION SYSTEM

TECHNICAL FIELD

The present invention relates to an on-vehicle communication system.

This application claims priority based on Japanese Patent Application No. 2017-235000 filed on Dec. 7, 2017, the entire contents of which are incorporated herein by reference.

BACKGROUND ART

For example, as a technology to realize automated traveling that reflects an occupant's intention, Patent Literature 1 (Japanese Laid-Open Patent Publication No. 2014-46748) discloses a technology as follows. That is, Patent Literature 1 discloses a vehicle control device for controlling a vehicle capable of performing automated driving in which at least a part of driving operation to be performed by a driver is automated. The vehicle control device includes: a preceding vehicle detection means that detects a preceding vehicle traveling ahead of the vehicle; a measurement means that measures a continuous detection time during which the preceding vehicle is continuously detected; and a mode selection means. When the automated driving is started, the mode selection means selects a following mode, in which the vehicle follows the preceding vehicle, if the continuous detection time is equal to or longer than a first threshold, and selects a passing mode, in which priority is placed on the set speed of the vehicle rather than following the preceding vehicle, if the continuous detection time is shorter than the first threshold.

CITATION LIST

Patent Literature

PATENT LITERATURE 1: Japanese Laid-Open Patent Publication No. 2014-46748

SUMMARY OF INVENTION (1) An on-vehicle communication system according to the present disclosure is an on-vehicle communication system mounted on a vehicle, and includes a master function unit, and a plurality of slave function units. The plurality of slave function units are able to transmit uplink communication signals to the master function unit via at least a common optical fiber.

One mode of the present disclosure can be realized not only as an on-vehicle communication system including such characteristic processing units, but also as a method including, as steps, such characteristic processes. Furthermore, one mode of the present disclosure can be realized as a semiconductor integrated circuit that implements a part or the entirety of the on-vehicle communication system.

BRIEF DESCRIPTION OF DRAWINGS

FIG. 8 shows an example of a setting table in the on-vehicle communication system according to the embodiment of the present disclosure.

DESCRIPTION OF EMBODIMENTS

Figure 1:
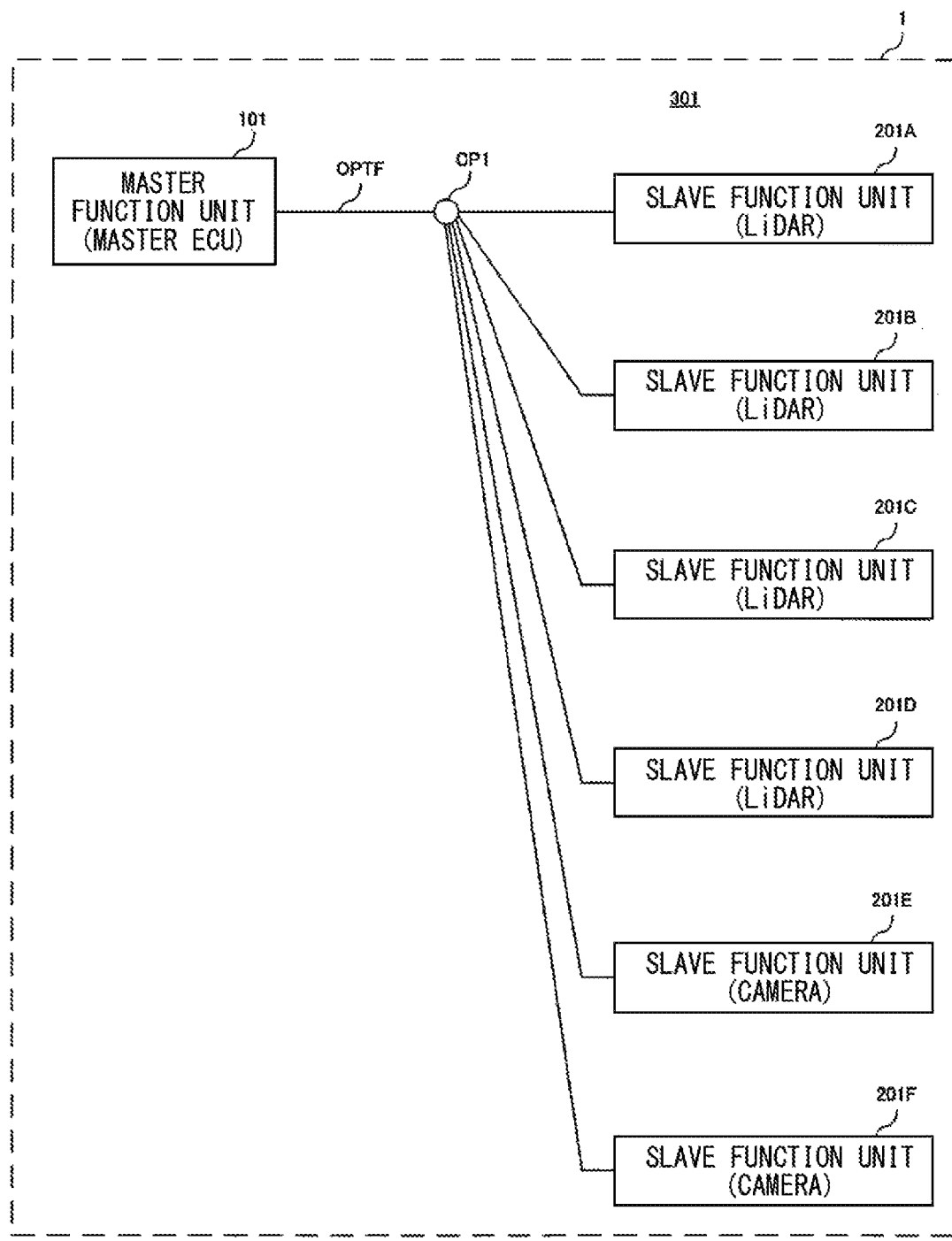
FIG. 1 shows an example of a configuration of an on-vehicle communication system according to an embodiment of the present disclosure.

To date, technologies related to automated traveling of vehicles have been developed.

Technical Problem

Since such automated driving requires many sensors, data traffic in a vehicle is increased. The data traffic in the vehicle tends to be significantly increased if the data traffic not related to automated driving, such as the data traffic for entertainment, is included.

In order to deal with such increase in the data traffic, optical fibers may be used in an on-vehicle communication system. Since many devices are mounted on a vehicle, if cables for electric signals are replaced with optical fibers, many optical fibers and optical transceivers are required.

However, many optical fibers and optical transceivers provided in the vehicle will cause an increase in cost. In addition, the space in the vehicle is limited.

The present disclosure is made to solve the above problems, and an object of the present disclosure is to provide an on-vehicle communication system capable of dealing with an increase in data traffic in a vehicle to achieve excellent efficiency.

Effect of the Present Disclosure

According to the present disclosure, it is possible to deal with an increase in data traffic in a vehicle, and achieve excellent efficiency.

Description Embodiments

First, contents of embodiments of the present invention will be listed for description.

(1) An on-vehicle communication system according to an embodiment of the present disclosure is an on-vehicle communication system that is mounted on a vehicle and includes a master function unit, and a plurality of slave function units. The plurality of slave function units are able to transmit uplink communication signals to the master function unit via at least a common optical fiber.

This configuration allows the optical fiber connected to the master function unit to be shared, and reduces the number of optical fibers and optical transceivers to be used. In addition, for example, when the slave function units are periodically operated, the optical fiber can be shared by the slave function units, whereby efficient data communication and effective use of resources can be realized. Therefore, the on-vehicle communication system can deal with an increase in data traffic in the vehicle, and realize excellent efficiency.

(2) Preferably, the plurality of slave function units are able to transmit the uplink communication signals of different rates.

This configuration allows optical transceivers of appropriate rates to be used according to the kinds or the like of the slave function units. Therefore, when a low-speed optical transceiver is used for a slave function unit that does not need high-speed data communication, the cost of the slave function unit can be reduced.

(3) Preferably, the master function unit fixedly allocates bandwidths in the optical fiber to the respective slave function units.

Thus, focusing on the fact that the system configurations of the master function unit and the slave function units are fixed in the vehicle, timings to transmit optical signals from the slave function units to the master function unit, the amounts of data to be transmitted, etc., are fixedly set by the master function unit, whereby efficient optical communication in the vehicle can be realized with a simpler configuration.

(4) More preferably, the master function unit determines a content of allocation of the bandwidths according to environment around the vehicle.

According to the above configuration, for example, since visibility of a camera degrades during the nighttime, the bandwidth allocated to a sensor other than the camera is increased. Thus, more appropriate bandwidth allocation can be realized while considering the priority levels of the slave function units according to the environment around the vehicle.

(5) More preferably, the master function unit determines a content of allocation of the bandwidths according to the traveling state of the vehicle.

For example, when the vehicle travels on an expressway, frequency of parking/stopping is reduced and therefore the necessity of comprehending the environment around the vehicle is reduced. In this case, according to the above configuration, for example, the bandwidth allocated to LiDAR (Light Detection and Ranging) is decreased while the bandwidth allocated to the camera is increased. Thus, more appropriate bandwidth allocation can be realized while considering the priority levels of the slave function units according to the traveling state of the vehicle.

(6) Preferably, the master function unit dynamically allocates bandwidths in the optical fiber to the respective slave function units.

Thus, the master function unit performs bandwidth allocation in response to, for example, requests from the slave function units, whereby more appropriate bandwidth allocation can be realized.

(7) Preferably, the master function unit is able to transmit a downlink communication signal to each slave function unit via the optical fiber, and the rate of the uplink communication signal transmitted from the slave function unit is greater than the rate of the downlink communication signal transmitted from the master function unit.

In the vehicle, the amount of data transmitted from the master function unit to a slave function unit is smaller than the amount of data transmitted from the slave function unit to the master function unit in many cases. Since the above configuration allows a low-speed optical transceiver to be used as the transmission optical transceiver of the master function unit, cost reduction can be achieved.

(8) Preferably, the master function unit does not transmit a communication signal to each slave function unit via the optical fiber.

Thus, data is transmitted through an electric signal from the master function unit to the slave function units, whereby components for optical communication from the master function unit to the slave function units are reduced, resulting in cost reduction. In addition, the cable length of the optical fiber in the vehicle is fixed. Therefore, when the master function unit is caused to store a signal delay time corresponding to the cable length in advance, it is possible to dispense with, for example, measurement of a time (RTT: Round Trip Time) required for data to be reciprocated between the master function unit and a slave function unit.

(9) More preferably, the on-vehicle communication system includes a plurality of master function units, and the respective slave function units are able to transmit the uplink communication signals to each of the master function units via at least a common optical fiber provided for each master function unit.

In the configuration having the plurality of master function units, for example, even when one of the master function units has failed, another master function unit can substitute for the failed master function unit, thereby enhancing the reliability of the on-vehicle communication system.

(10) Preferably, the master function unit is able to intermittently transmit a downlink optical signal to each slave function unit via the optical fiber.

This configuration allows the optical transceiver to intermittently emit light during a time period when data needs to be transmitted, thereby reducing power consumption.

(11) More preferably, the master function unit is able to transmit the downlink communication signal to each slave function unit via the optical fiber, and the master function unit and the slave function units use optical signals of the same wavelength.

In this configuration, since the master function unit and the slave function unit can share components by using the common optical transceiver, cost reduction can be achieved.

Hereinafter, an embodiment of the present disclosure will be described with reference to the drawings. In the drawings, the same or corresponding parts are denoted by the same reference signs, and description thereof is not repeated. At least some parts of the embodiment described below may be combined as desired.

FIG. 1 shows an example of a configuration of an on-vehicle communication system according to the present embodiment.

With reference to FIG. 1, an on-vehicle communication system 301 is, for example, a PON (Passive Optical Network) system, and includes a master function unit 101, a plurality of slave function units 201, and a coupler CP1. The master function unit 101 is connected to the plurality of slave function units 201 via the coupler CP1 and an optical fiber OPTF, and exchanges optical signals with the respective slave function units 201. The on-vehicle communication system 301 may be an optical communication system other than the PON system.

The direction from the slave function units 201 to the master function unit 101 is referred to as "uplink direction", and the direction from the master function unit 101 to the slave function units 201 is referred to as "downlink direction". The on-vehicle communication system 301 is a TDM-PON system, for example. Specifically, in the on-vehicle communication system 301, the uplink direction corresponds to time division multiple access (TDMA), and the downlink direction corresponds to time division multiplexing (TDM).

The master function unit 101 is, for example, an ECU (Engine Control Unit), and is connected to LiDARs 201A, 201B, 201C, and 201D, a camera 201E, and a camera 201F which are examples of the slave function units 201.

Hereinafter, each of the LiDARs 201A, 201B, 201C, and 201D is also referred to as "LiDAR 201".

Examples of the LiDAR 201 include: laser equipment for irradiating an object with laser light; a light-receiving element for receiving scattered light of the laser light due to the object; a CPU (Central Processing Unit) equipped with corresponding software; and a processing circuit.

The LiDARs 201A, 201B, 201C, and 201D are provided at a left portion, a right portion, a front portion, and a rear portion of a vehicle 1, and are able to detect objects located to the left of, to the right of, in front of, and behind the vehicle 1, respectively.

The LiDAR 201 performs measurement as to whether an object is present around the vehicle 1, in response to a measurement request from the master function unit 101.

The master function unit 101 is able to perform, for example, driver assistance for the vehicle 1. More specifically, the master function unit 101 acquires a measurement result of each LiDAR 201 from the LiDAR 201, and performs driver assistance based on the acquired measurement result.

Each of the camera 201E and the camera 201F is, for example, an imaging device for periodically photographing the periphery of the vehicle 1, and includes an imaging element for photographing the periphery of the vehicle 1, a CPU equipped with corresponding software, a processing circuit, etc.

The slave function units 201 are not limited to the LiDARs and the cameras, and may be a TCU (Telematics Communication Unit), a gateway device, a human-machine interface, a millimeter-wave sensor, a navigation device, etc.

Each slave function unit 201 is able to transmit an uplink optical signal including an uplink communication signal such as a frame, via the common optical fiber OPTF to the master function unit 101.

Figure 2:
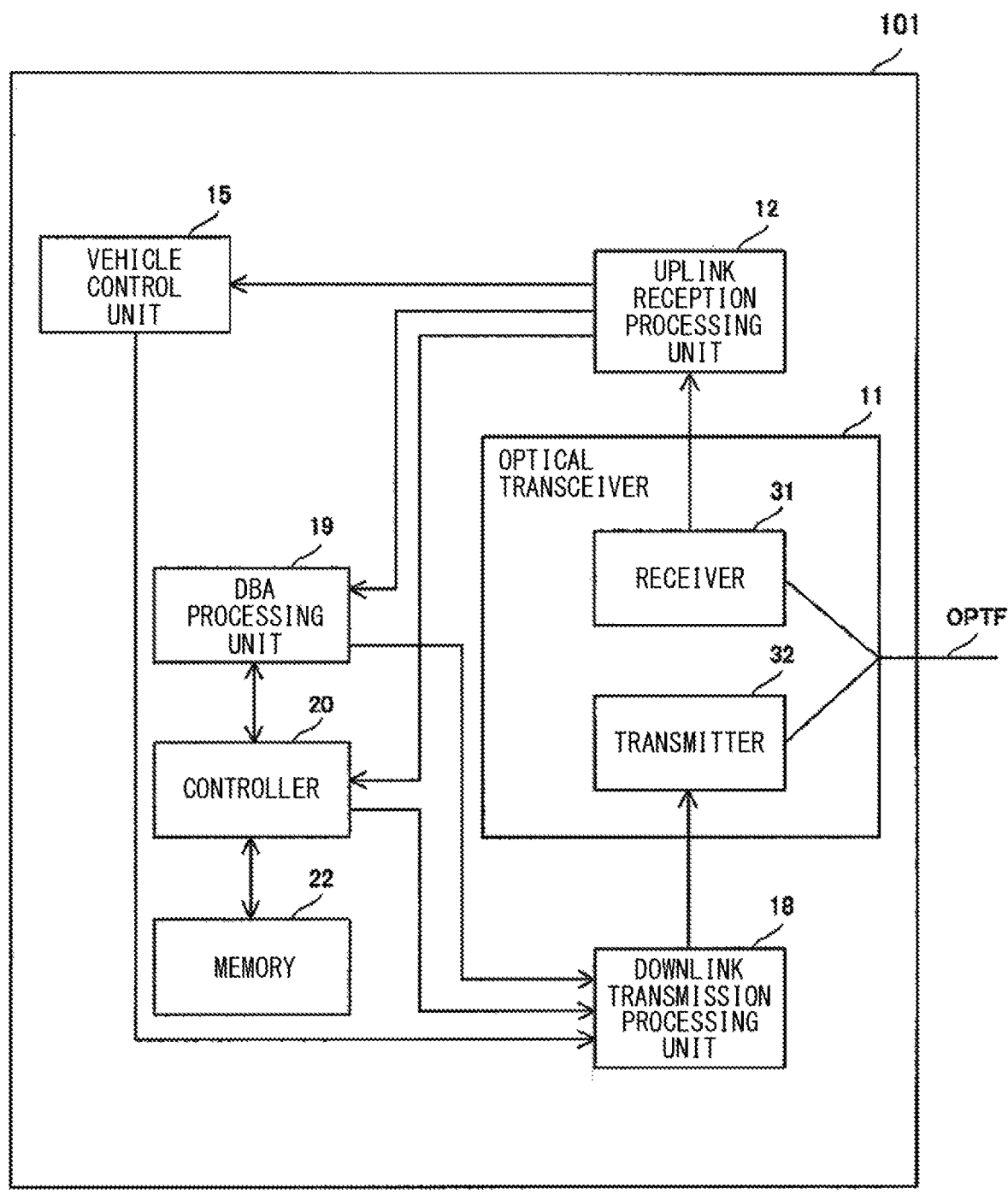
FIG. 2 is a block diagram showing a configuration of a master function unit according to the embodiment of the present disclosure.

FIG. 2 is a block diagram showing the configuration of the master function unit according to the present embodiment.

With reference to FIG. 2, the master function unit 101 includes an optical transceiver 11, an uplink reception processing unit 12, a vehicle control unit 15, a downlink transmission processing unit 18, a DBA (Dynamic Bandwidth Allocation) processing unit 19, a controller 20, and a memory 22. The optical transceiver 11 includes a receiver 31 and a transmitter 32.

The master function unit 101 is able to transmit a downlink optical signal including a downlink communication signal such as a frame, via the common optical fiber OPTF to each slave function unit 201. The downlink optical signal is a continuous signal, for example.

In the master function unit 101, the optical transceiver 11 is connected to the optical fiber OPTF. In order to realize bidirectional communication with each slave function unit 201 via the optical fiber OPTF, the receiver 31 in the optical transceiver 11 receives an uplink optical signal having a specific wavelength, e.g., 1280 nm band, from the optical fiber OPTF, converts the received uplink optical signal into an electric signal, and outputs the electric signal to the uplink reception processing unit 12.

The transmitter 32 in the optical transceiver 11 converts an electric signal received from the downlink transmission processing unit 18 into a downlink optical signal having another wavelength, and outputs the electric signal to the optical fiber OPTF. For example, the optical transceiver 11 converts the electric signal received from the downlink transmission processing unit 18 into a downlink optical signal having a wavelength of 1570 nm band, and transmits the downlink optical signal to each slave function unit 201.

The uplink reception processing unit 12 reconstructs a frame from the electric signal received from the optical transceiver 11, and distributes the frame to any of the DBA processing unit 19, the controller 20, and the vehicle control unit 15 according to the kind of the frame. Specifically, the uplink reception processing unit 12 outputs a data frame to the vehicle control unit 15, and outputs a control frame to the DBA processing unit 19 and the controller 20.

The vehicle control unit 15 acquires, for example, information required for a control of the vehicle 1 from the data frame received from the uplink reception processing unit 12, and performs the control based on the acquired information.

The vehicle control unit 15 outputs, to the downlink transmission processing unit 18, a data frame for transmitting, for example, set values of the cameras and the LiDARs to the slave function units 201.

The DBA processing unit 19 and the controller 20 generate a control frame indicating various kinds of control information, and transmit the control frame to the downlink transmission processing unit 18.

The downlink transmission processing unit 18 converts the data frame received from the vehicle control unit 15 into an electric signal of a physical layer, and outputs the electric signal to the optical transceiver 11. The downlink transmission processing unit 18 also converts the control frame received from the DBA processing unit 19 and the controller 20 into an electric signal of a physical layer, and outputs the electric signal to the optical transceiver 11.

The master function unit 101 dynamically allocates, to each slave function unit 201, a bandwidth in the optical fiber OPTF, i.e., an uplink bandwidth in the communication line from the slave function unit 201 to the master function unit 101.

More specifically, the DBA processing unit 19 and the controller 20 generate a control frame such as a MPCP (Multipoint Control Protocol) frame for managing the on-vehicle communication system and the slave function units 201, and transmits the control frame to the slave function units 201 via the downlink transmission processing unit 18. In addition, the DBA processing unit 19 and the controller 20 receive control frames such as MPCP frames transmitted from the slave function units 201 via the uplink reception processing unit 12, and perform corresponding processes.

Specifically, the DBA processing unit 19 and the controller 20 perform a process related to control of the communication line between the master function unit 101 and the slave function unit 201, according to MPCP or the like. That is, the DBA processing unit 19 and the controller 20 exchange MPCP messages with the slave function units 201 connected to the on-vehicle communication system to perform uplink access control and downlink access control including bandwidth allocation.

For example, based on an allocation request for an uplink bandwidth in the communication line, received from a slave function unit 201, the DBA processing unit 19 allocates a temporal uplink bandwidth in the communication line to the slave function unit 201. Specifically, based on a report frame indicating an allocation request for a bandwidth in the communication line, received from a slave function unit 201, the DBA processing unit 19 allocates a bandwidth in the communication line to the slave function unit 201, i.e., transmits a gate frame describing a grant to the slave function unit 201.

The DBA processing unit 19 repeats an allocation cycle, i.e., a DBA cycle, including: a reception period during which an allocation request for a bandwidth in the communication line is received from each slave function unit 201; and a reception period during which an uplink frame from each slave function unit 201 is received as scheduled. The DBA processing unit 19, for example, calculates the amount of bandwidth to be allocated during the scheduled reception period for the uplink frame from each slave function unit 201.

In the on-vehicle communication system 301, not only TDMA but also wavelength division multiplexing (WDM) suitable for communication of a larger amount of data may be used in the uplink direction. In this case, the respective slave function units 201 transmit uplink optical signals having different wavelengths.

In the on-vehicle communication system 301, not only TDM but also wavelength division multiplexing (WDM) suitable for communication of a larger amount of data may be used in the downlink direction. In this case, the master function unit 101 transmits downlink optical signals of different wavelengths to the respective slave function units 201.

In the on-vehicle communication system 301, not only TDMA but also code division multiplexing (CDM) suitable for communication of a larger amount of data may be used in the uplink direction. In this case, the respective slave function units 201 transmit uplink optical signals including communication signals spread according to different spread codes.

In the on-vehicle communication system 301, not only TDM but also code division multiplexing (CDM) suitable for communication of a larger amount of data may be used in the downlink direction. In this case, the master function unit 101 transmits, to the respective slave function units 201, downlink optical signals including communication signals spread according to different spread codes.

In the on-vehicle communication system 301, not only the aforementioned methods but also frequency division multiplexing (FDM), space division multiplexing (SDM), time and wavelength division multiplexing (TWDM), or the like suitable for communication of a larger amount of data may be used.

The receiver 31 and the transmitter 32 in the optical transceiver 11 may use different optical fibers OPTF in the uplink direction and the downlink direction.

[Modification 1]

The on-vehicle communication system 301 may be configured such that the respective slave function units 201 are able to transmit uplink communication signals of different rates.

In this case, each slave function unit 201 includes a low-speed optical transceiver or a high-speed optical transceiver.

Specifically, for example, the LiDARs 201A, 201B, 201C, and 201D each include a low-speed optical transceiver, and the camera 201E and the camera 201F each include a high-speed optical transceiver.

In the on-vehicle communication system 301, the low-speed optical transceiver and the high-speed optical transceiver included in the slave function units 201 each transmit, for example, an uplink optical signal having a wavelength of 1280 nm band to the master function unit 101.

Figure 3:
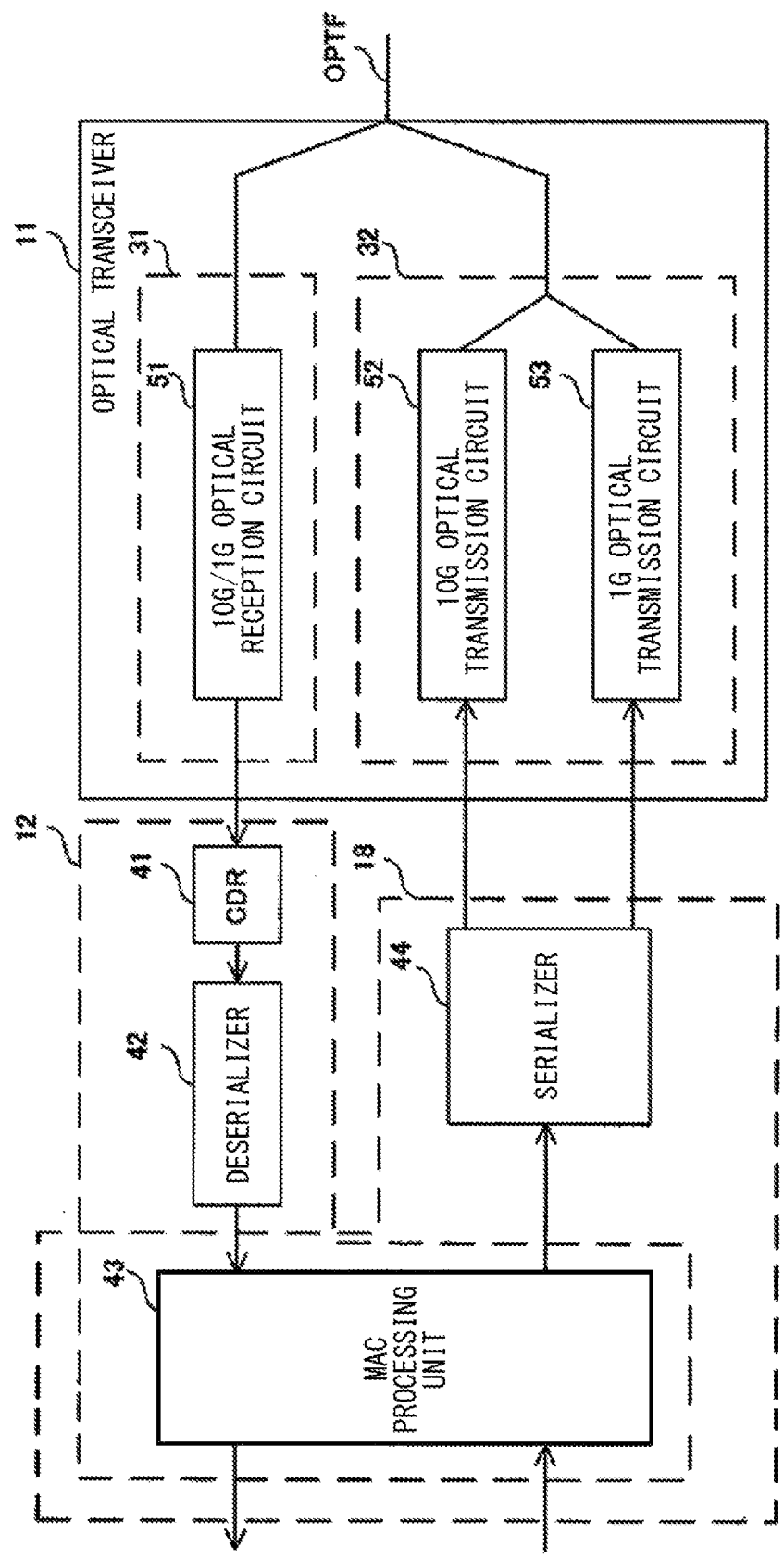
FIG. 3 shows an example of a configuration of a part of the master function unit in the on-vehicle communication system according to the embodiment of the present disclosure.

FIG. 3 shows an example of a configuration of a part of the master function unit in the on-vehicle communication system according to the present embodiment.

With reference to FIG. 3, the uplink reception processing unit 12 includes a CDR (Clock and Data Recovery) 41, a deserializer 42, and a MAC (Media Access Control) processing unit 43. The downlink transmission processing unit 18 includes the MAC processing unit 43 and a serializer 44. In the optical transceiver 11, the receiver 31 includes a 10G/1G optical reception circuit 51. The transmitter 32 includes a 10G optical transmission circuit 52 and a 1G optical transmission circuit 53.

In the uplink direction, the 10G/1G optical reception circuit 51 in the optical transceiver 11 receives, from a slave function unit 201, an optical signal corresponding to 1 Gbps or 10 Gbps and having a wavelength of 1280 nm band, converts the received optical signal into a 1 Gbps or 10 Gbps electric signal, and outputs the electric signal.

The CDR 41 performs reshaping of the electric signal received from the 10G/1G optical reception circuit 51, extracts a timing from the electric signal, and performs retiming for the electric signal, based on the extracted timing, thereby establishing synchronization with the slave function unit 201.

The deserializer 42 converts the serial electric signal received from the CDR 41 into a parallel electric signal, and outputs the parallel electric signal to the MAC processing unit 43.

The MAC processing unit 43 subjects the electric signal received from the deserializer 42 to a predetermined process regarding a MAC layer, thereby reconstructing a frame.

In the downlink direction, the serializer 44 converts the parallel electric signal received from the MAC processing unit 43 into a serial electric signal, and transmits the serial electric signal to the 10G optical transmission circuit 52 or the 1G optical transmission circuit 53 in the optical transceiver 11 according to the speed.

The 10G optical transmission circuit 52 converts the 10 Gbps electric signal received from the serializer 44 into a downlink optical signal corresponding to 10 Gbps and having a wavelength of 1570 nm band, and transmits the downlink optical signal to the slave function unit 201.

The 1G optical transmission circuit 53 converts the 1 Gbps electric signal received from the serializer 44 into a downlink optical signal corresponding to 1 Gbps and having a wavelength of 1490 nm band, and transmits the downlink optical signal to the slave function unit 201.

The on-vehicle communication system 301 may be configured to use optical signals having different wavelengths for communication in the uplink direction and communication in the downlink direction, respectively. In this case, in the communication in the uplink direction, the slave function units 201 of different rates transmit uplink optical signals of different wavelengths by using WDM.

In the communication in the downlink direction, the master function unit 101 transmits downlink optical signals of different wavelengths to the slave function units 201 of different rates by using WDM.

Figure 4:
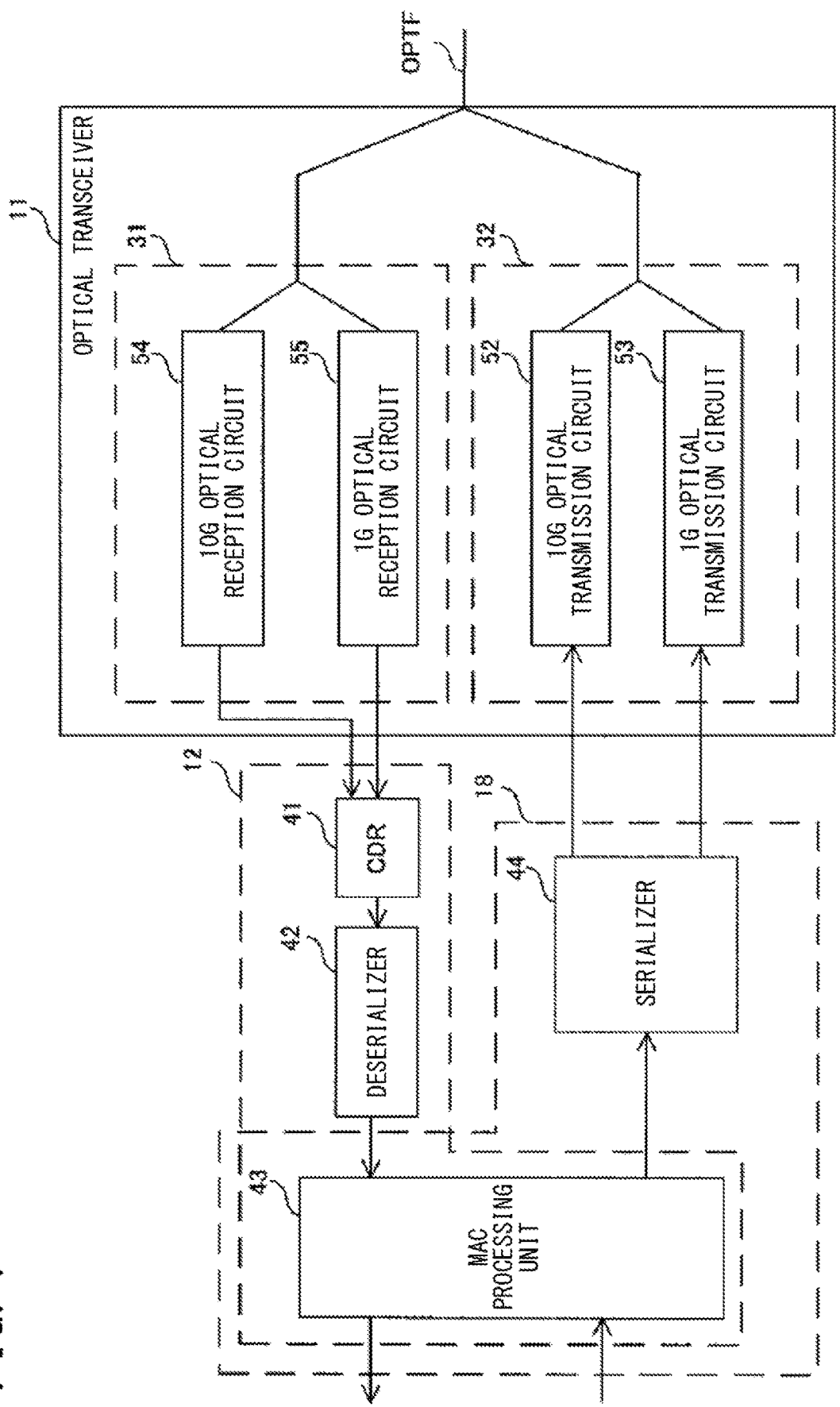
FIG. 4 shows another example of the configuration of a part of the master function unit in the on-vehicle communication system according to the embodiment of the present disclosure.

FIG. 4 shows another example of the configuration of a part of the master function unit in the on-vehicle communication system according to the present embodiment.

With reference to FIG. 4, the master function unit 101 is different from the master function unit 101 shown in FIG. 3 in that a 10G optical reception circuit 54 and a 1G optical reception circuit 55 are provided instead of the 10G/1G optical reception circuit 51.

The 10G optical reception circuit 54 receives, from a slave function unit 201, an optical signal corresponding to 10 Gbps and having a wavelength of 1200 nm band, for example, converts the received optical signal into a 10 Gbps electric signal, and outputs the 10 Gbps electric signal to the CDR 41.

The 1G optical reception circuit 55 receives, from a slave function unit 201, an optical signal corresponding to 1 Gbps and having a wavelength of 1300 nm band, for example, converts the received optical signal into a 1 Gbps electric signal, and outputs the 1 Gbps electric signal to the CDR 41.

The 10G optical transmission circuit 52 converts a 10 Gbps electric signal received from the serializer 44 into a downlink optical signal corresponding to 10 Gbps and having a wavelength of 1500 nm band, for example, and transmits the downlink optical signal to the slave function unit 201.

The 1G optical transmission circuit 53 converts a 1 Gbps electric signal received from the serializer 44 into a downlink optical signal corresponding to 1 Gbps and having a wavelength of 1400 nm band, for example, and transmits the downlink optical signal to the slave function unit 201.

Between the slave function units 201 of the same rate, TDMA is used for communication in the uplink direction, and TDM is used for communication in the downlink direction.

[Modification 2]

The on-vehicle communication system 301 may be configured such that the master function unit performs FBA (Fixed Bandwidth Allocation) of fixedly allocating a bandwidth in the optical fiber OPTF to each slave function unit 201.

Figure 5:
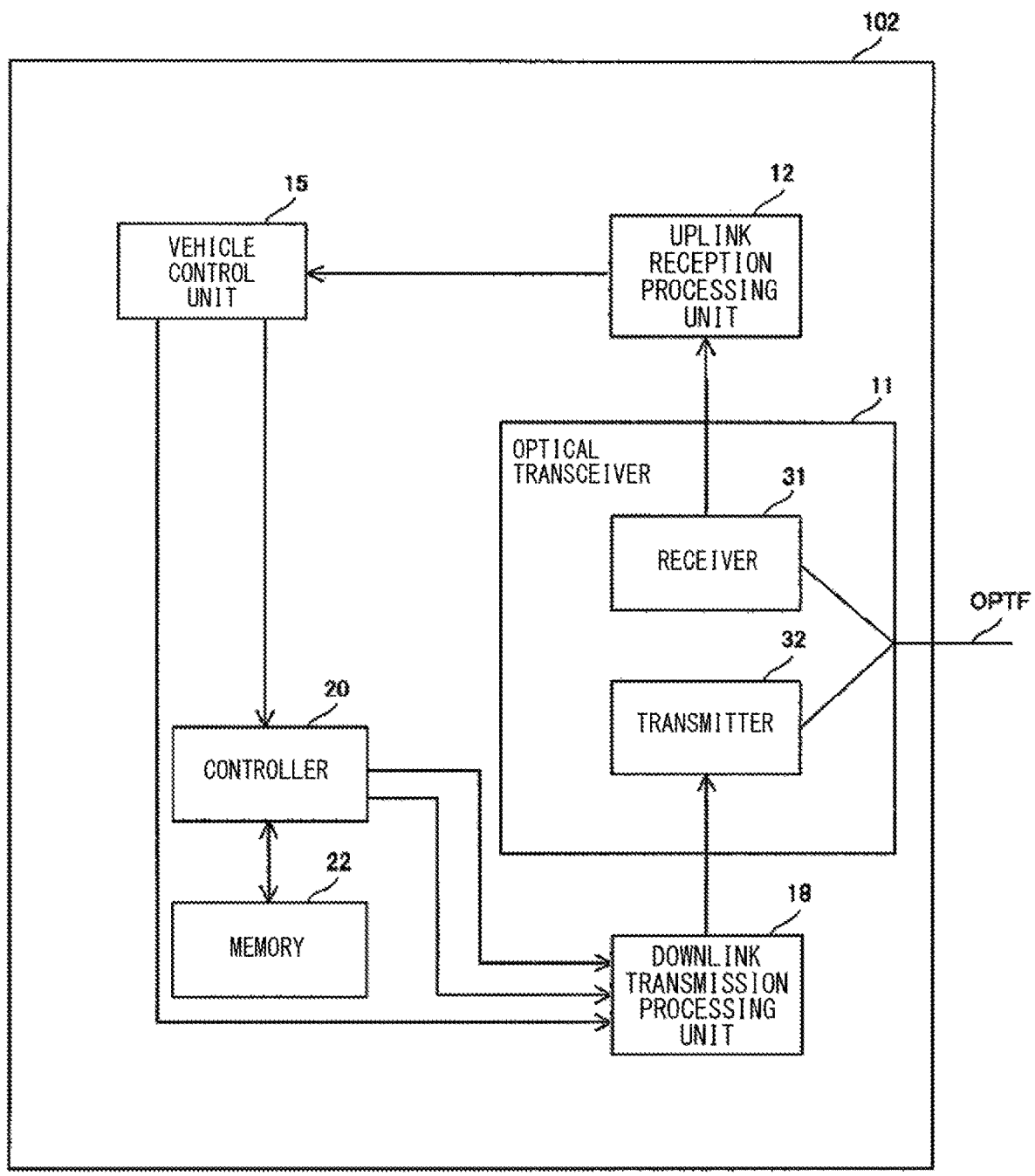
FIG. 5 is a block diagram showing a configuration of a master function unit in a second modification of the on-vehicle communication system according to the embodiment of the present disclosure.

FIG. 5 is a block diagram showing a configuration of a master function unit in a second modification of the on-vehicle communication system according to the present embodiment.

With reference to FIG. 5, the master function unit 102 does not include the DBA processing unit 19, in contrast to the master function unit 101 shown in FIG. 2.

The uplink reception processing unit 12 reconstructs a frame from the electric signal received from the optical transceiver 11, and outputs the frame to the vehicle control unit 15.

The memory 22 has previously stored therein transmission timings of optical signals from the respective slave function units 201 to the master function unit 102, according to the kinds, priority levels, etc., of the slave function units 201, in a temporal uplink bandwidth allocation cycle corresponding to the aforementioned DBA cycle.

Figure 6:
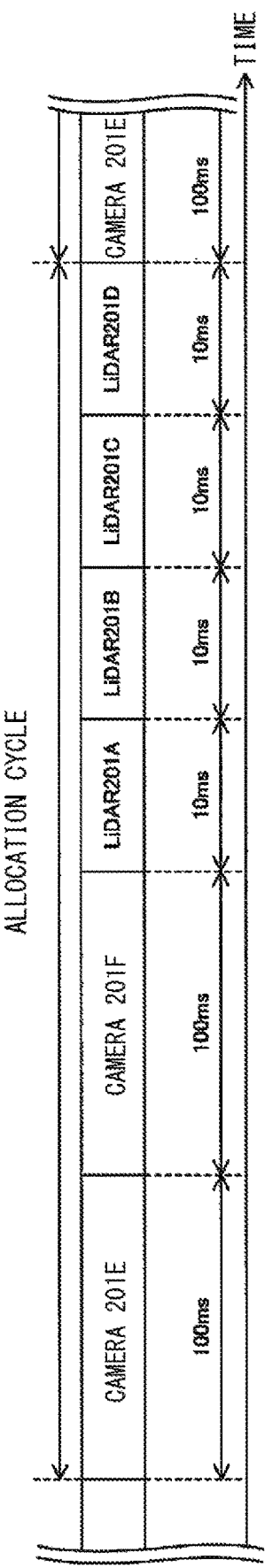
FIG. 6 shows an example of transmission timings from slave function units in the second modification of the on-vehicle communication system according to the embodiment of the present disclosure.

FIG. 6 shows an example of transmission timings from the respective slave function units in the second modification of the on-vehicle communication system according to the present embodiment.

With reference to FIG. 6, in the allocation cycle, first, camera 201E transmits an optical signal for 100 ms to the master function unit 102. Next, the camera 201F transmits an optical signal for 100 ms to the master function unit 102. Next, the LiDAR 201A transmits an optical signal for 10 ms to the master function unit 102, the LiDAR 201B transmits an optical signal for 10 ms to the master function unit 102, the LiDAR 201C transmits an optical signal for 10 ms to the master function unit 102, and the LiDAR 201D transmits an optical signal for 10 ms to the master function unit 102. Then, in the subsequent allocation cycle, the camera 201E transmits an optical signal for 100 ms to the master function unit 102.

For example, when an engine has started, the controller 20 generates a control frame indicating the set values stored in the memory 22, and transmits the control frame to the respective slave function units 201 via the downlink transmission processing unit 18 and the optical fiber OPTF.

[Modification 3]

The on-vehicle communication system may be configured such that the master function unit 102 fixedly allocates a temporal bandwidth in the optical fiber OPTF to each slave function unit 201, and determines the content of bandwidth allocation in accordance with the environment around the vehicle 1 or the traveling state of the vehicle 1.

Figure 7:
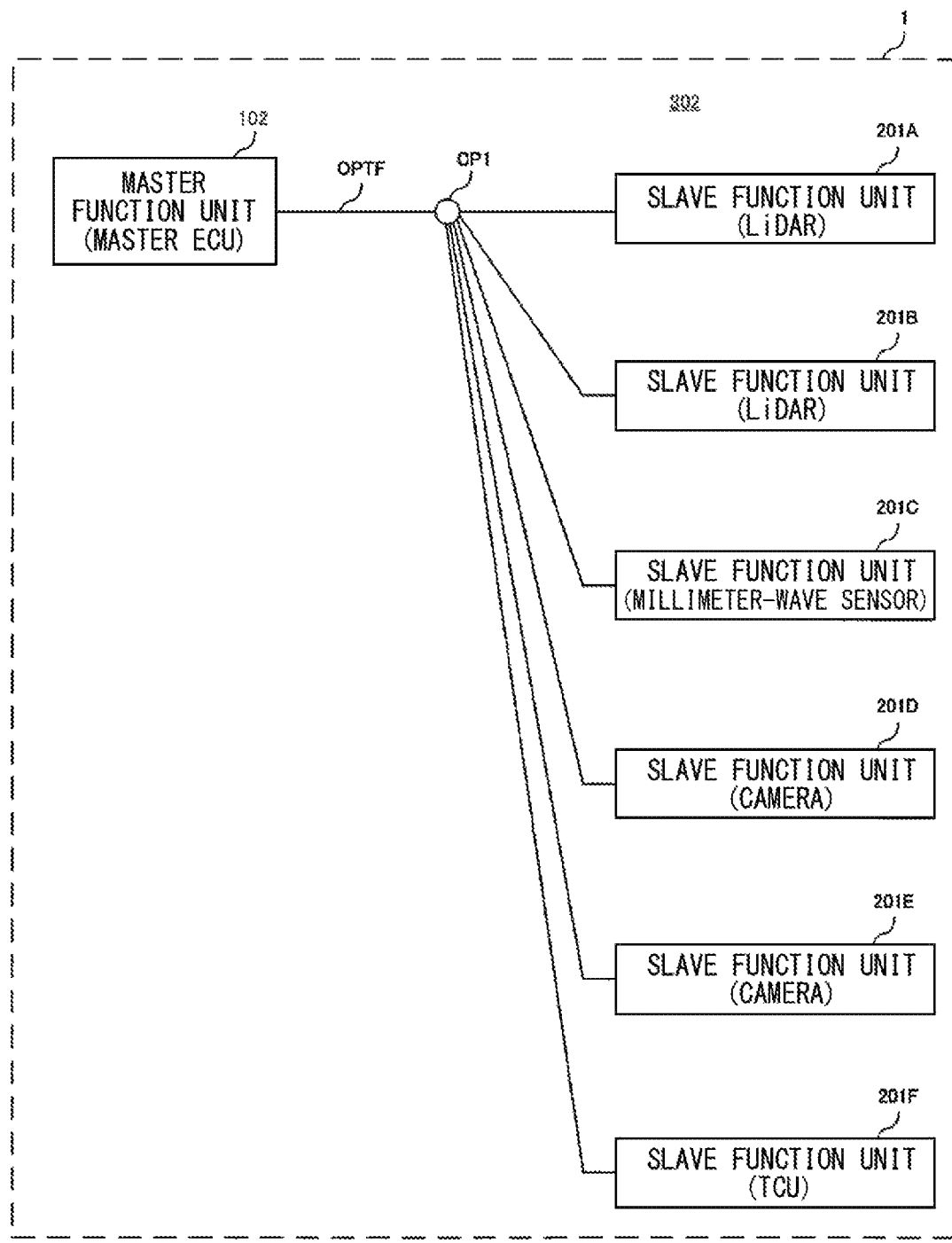
FIG. 7 shows an example of a configuration of a third modification of the on-vehicle communication system according to the embodiment of the present disclosure.

FIG. 7 shows an example of a configuration of a third modification of the on-vehicle communication system according to the present embodiment.

With reference to FIG. 7, an on-vehicle communication system 302 includes a master function unit 102, a plurality of slave function units 201, and a coupler CP1. The master function unit 102 is, for example, an ECU, and is connected to LiDARs 201A, 201B, a millimeter-wave sensor 201C, cameras 201D, 201E, and a TCU 201F which are examples of the slave function units 201.

With reference to FIG. 5 and FIG. 7, the vehicle control unit 15 extracts information indicating the environment around the vehicle 1 (hereinafter also referred to as "environment information") or information indicating the traveling state of the vehicle 1 (hereinafter also referred to as "traveling information"), which are included in an optical signal transmitted from each slave function unit 201. The vehicle control unit 15 outputs the extracted information to the controller 20.

Specifically, for example, the vehicle control unit 15 extracts an image, as an example of environment information, which is included in an uplink optical signal transmitted from the camera 201E, and outputs the image to the controller 20. The environment information may be weather, season, indoor environment of the vehicle 1, etc.

The controller 20 analyzes the image received from the vehicle control unit 15 to calculate an illuminance IL around the vehicle 1.

When the calculated illuminance IL is smaller than a predetermined threshold Th1, the controller 20 determines that the periphery of the vehicle 1 is dark and it is night.

The vehicle control unit 15 extracts traveling information such as a yaw rate, vehicle speed, acceleration, whether or not the vehicle 1 is parked/stopped, whether an occupant is present in the back seat, whether the vehicle 1 is a following vehicle in convoy traveling, and whether the vehicle 1 is in the automated driving mode. The vehicle control unit 15 outputs the traveling information to the controller 20.

Based on the traveling information received from the vehicle control unit 15, the controller 20 determines, for example, whether the vehicle 1 is traveling on an ordinary road or an expressway.

The controller 20 determines the content of bandwidth allocation in the optical fiber OPTF, based on at least one of the environment around the vehicle 1 and the traveling state of the vehicle 1 which have been determined (hereinafter, the at least one of the environment and the traveling state is also referred to as "vehicle state").

More specifically, the memory 22 has previously stored therein a setting table indicating the content of allocation according to the vehicle state.

FIG. 8 shows an example of the setting table in the on-vehicle communication system according to the present embodiment.

With reference to FIG. 8, the controller 20 selects the content of allocation corresponding to the determined vehicle state while referring to the setting table. For example, in the case where the vehicle 1 is in the automated driving mode and travels on an ordinary road in the daytime, the controller 20 allocates, of the bandwidth of the allocation cycle, 35% to the camera 201D, 35% to the camera 201E, 10% to the LiDAR 201A, 10% to the LiDAR 201B, 5% to the millimeter-wave sensor 201C, and 5% to the TCU 201F.

For example, when the vehicle 1 is in the automated driving mode and travels on an ordinary road in the nighttime, the controller 20 allocates, of the bandwidth of the allocation cycle, 15% to the camera 201D, 15% to the camera 201E, 25% to the LiDAR 201A, 25% to the LiDAR 201B, 15% to the millimeter-wave sensor 201C, and 5% to the TCU 201F.

For example, when the vehicle 1 is in the automated driving mode and travels on an expressway in the daytime, the controller 20 allocates, of the bandwidth of the allocation cycle, 30% to the camera 201D, 30% to the camera 201E, 5% to the LiDAR 201A, 5% to the LiDAR 201B, 5% to the millimeter-wave sensor 201C, and 25% to the TCU 201F.

The controller 20 generates a control frame indicating the selected content of allocation, and transmits the control frame to the respective slave function units 201 via the downlink transmission processing unit 18 and the optical fiber OPTF.

When the vehicle state has changed, the controller 20 newly selects the content of allocation corresponding to the changed vehicle state.

Specifically, for example, when the controller 20 has determined that the vehicle 1 traveling on an expressway in the daytime has entered a state where no vehicle follows the vehicle 1, the controller 20 newly selects the content of allocation in which the percentage allocated to the rear camera and LiDAR is reduced while the percentage allocated to the TCU is increased.

For example, the controller 20 allocates, of the bandwidth of the allocation cycle, 30% to the camera 201D, 10% to the camera 201E, 5% to the LiDAR 201A, 2% to the LiDAR 201B, 5% to the millimeter-wave sensor 201C, and 48% to the TCU 201F.

Meanwhile, when the controller 20 has determined that the mode of the vehicle 1 has changed to the manual mode, since the necessity of acquiring the state of the periphery of the vehicle 1 is reduced, the controller 20 newly selects the content of allocation in which the percentage allocated to the TCU is increased. The controller 20 allocates, of the bandwidth of the allocation cycle, 10% to the camera 201D, 10% to the camera 201E, 5% to the LiDAR 201A, 5% to the LiDAR 201B, 5% to the millimeter-wave sensor 201C, and 65% to the TCU 201F.

[Modification 4]

The on-vehicle communication system 301 may be configured such that the rate of an uplink communication signal transmitted from each slave function unit 201 is greater than the rate of a downlink communication signal transmitted from the master function unit 101.

Specifically, the master function unit 101 transmits, for example, a 1 Gbps downlink optical signal to each slave function unit 201. Each slave function unit 201 transmits, for example, a 10 Gbps uplink optical signal to the master function unit 101.

In this case, the optical transceiver in the master function unit 101 does not include the 10G optical transmission circuit 52, in contrast to the optical transceiver shown in FIG. 3.

[Modification 5]

The master function unit may be configured so as not to transmit a communication signal to the slave function units 201 via the optical fiber OPTF.

Figure 9:
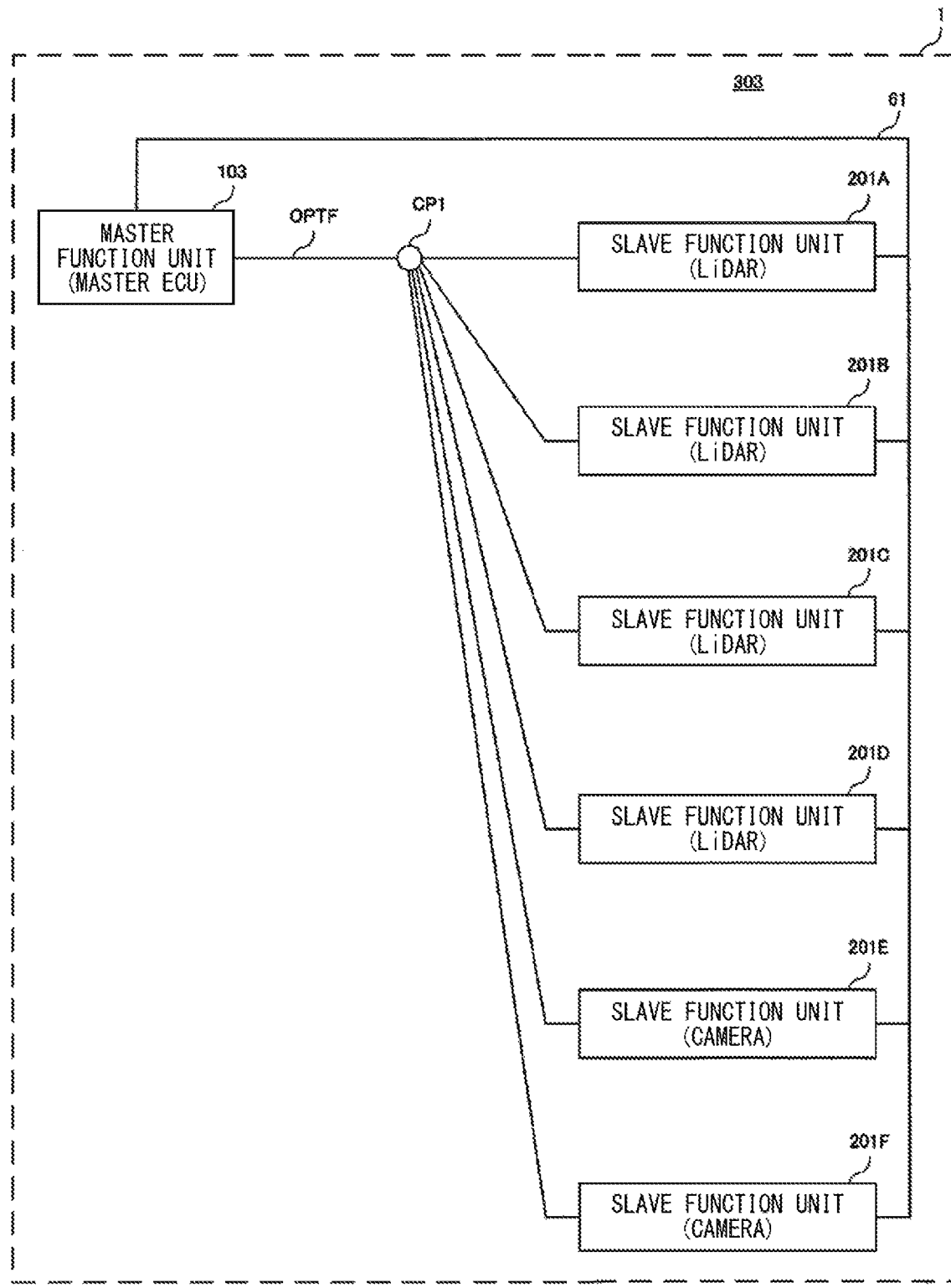
FIG. 9 shows an example of a configuration of a fifth modification of the on-vehicle communication system according to the embodiment of the present disclosure.

FIG. 9 shows an example of a configuration of a fifth modification of the on-vehicle communication system according to the present embodiment.

With reference to FIG. 9, an on-vehicle communication system 303 includes a master function unit 103, and LiDARs 201A, 201B, 201C, and 201D, a camera 201E, a camera 201F, and a coupler CP1 which are examples of the plurality of slave function units 201. The master function unit 103 is connected to the plurality of slave function units 201 via the coupler CP1 and an optical fiber OPTF, and the respective slave function units 201 transmit optical signals to the master function unit 103.

The on-vehicle communication system 303 includes a CAN bus 61 according to the standard of CAN (Controller Area Network) (registered trademark). The master function unit 103 transmits an electric signal to the plurality of slave function units 201 via the CAN bus 61.

Figure 10:
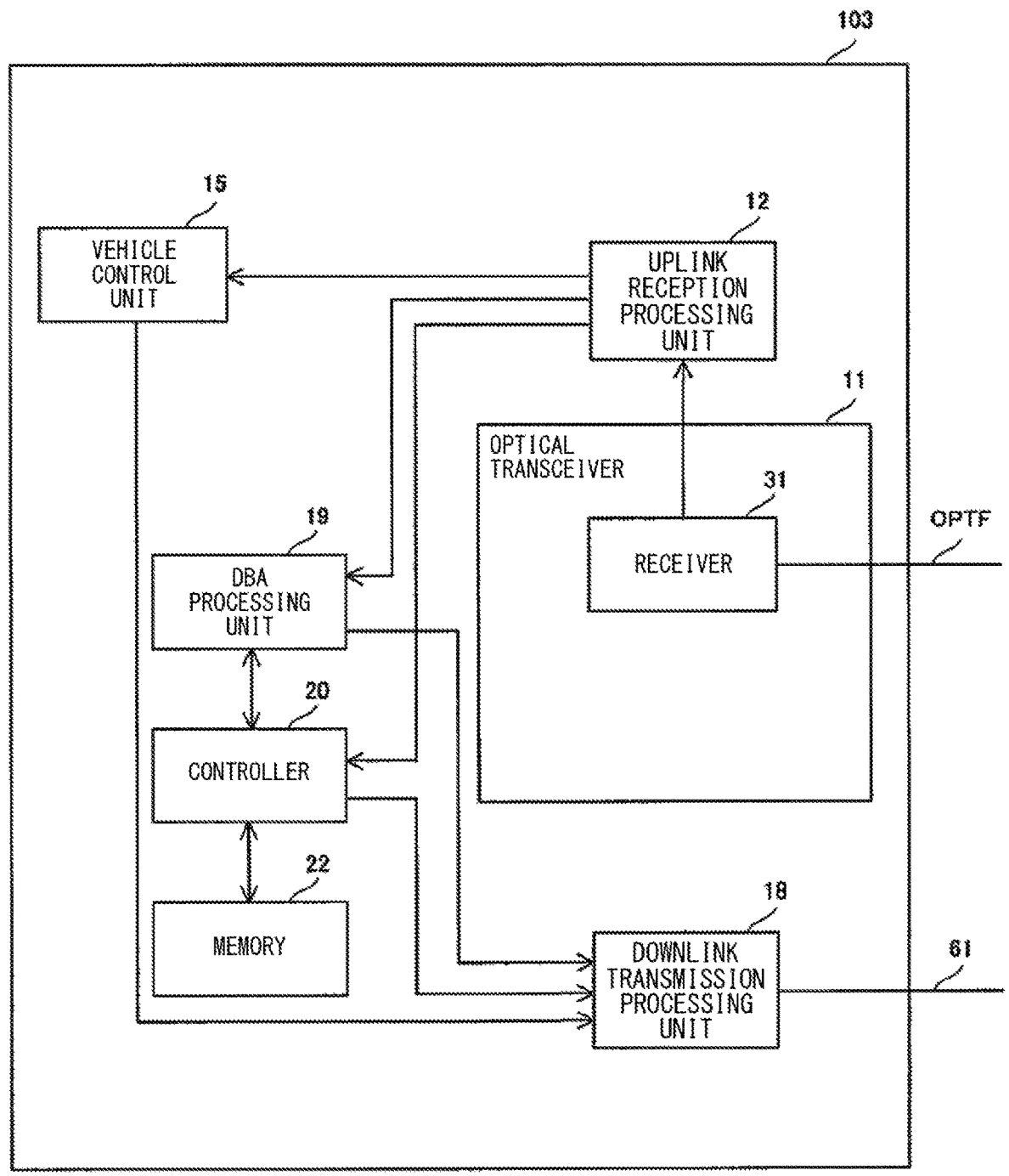
FIG. 10 is a block diagram showing a configuration of a master function unit in the fifth modification of the on-vehicle communication system according to the embodiment of the present disclosure.

FIG. 10 is a block diagram showing the configuration of the master function unit in the fifth modification of the on-vehicle communication system according to the present embodiment.

With reference to FIG. 10, the master function unit 103 does not include the transmitter 32, in contrast to the master function unit shown in FIG. 2.

In the master function unit 103, the downlink transmission processing unit 18 converts a data frame received from the vehicle control unit 15 and a control frame received from the DBA processing unit 19 and the controller 20 into electric signals of physical layers, and transmits the electric signals to the plurality of slave function units 201 via the CAN bus 61.

[Modification 6]

The on-vehicle communication system may include a plurality of master function units 101, and the slave function units 201 may transmit uplink communication signals to each master function unit 101 via at least a common optical fiber OPTF that is provided for each master function unit 101.

Figure 11:
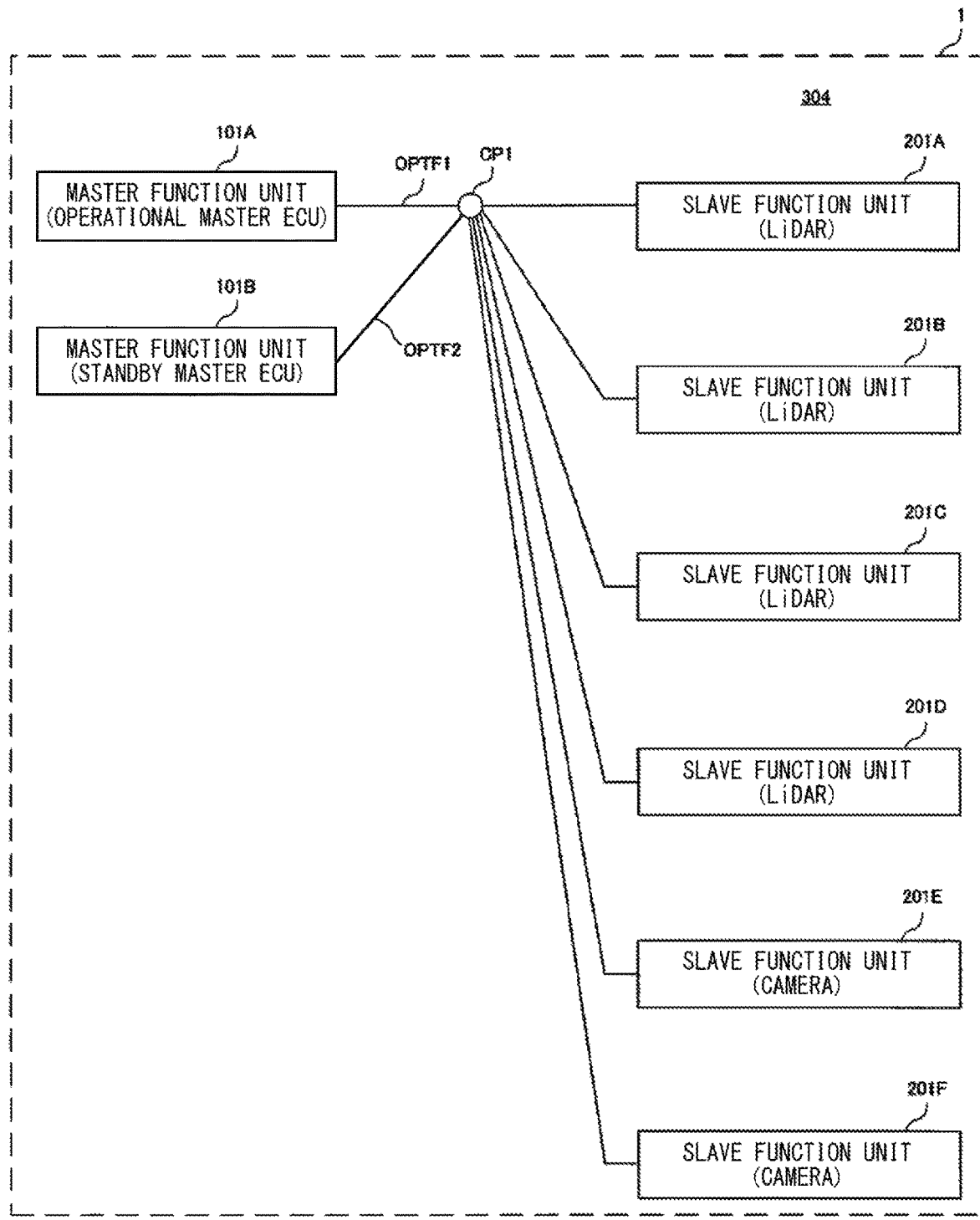
FIG. 11 shows an example of a configuration of a sixth modification of the on-vehicle communication system according to the embodiment of the present disclosure.

FIG. 11 shows an example of a configuration of a sixth modification of the on-vehicle communication system according to the present embodiment.

With reference to FIG. 11, an on-vehicle communication system 304 includes master function units 101A, 101B corresponding to the aforementioned master function unit 101, and LiDARs 201A, 201B, 201C, and 201D, a camera 201E, a camera 201F, and a coupler CP1 which are examples of the plurality of slave function units 201.

The master function unit 101A is, for example, an operational master ECU, and the master function unit 101B is, for example, a standby master ECU. The master function unit 101A and the master function unit 101B are connected to, for example, a high-end ECU (not shown), and the high-end ECU controls the master function unit 101A and the master function unit 101B.

The master function unit 101A and the master function unit 101B are connected to the respective slave function units 201 via the coupler CP1.

More specifically, for example, the master function unit 101A is connected to the respective slave function units 201 via the coupler CP1 and the optical fiber OPTF1, and optical signals are exchanged therebetween. In addition, the master function unit 101A performs processing related to control of the communication line between the master function unit 101A and the respective slave function units 201.

The master function unit 101B is connected to the respective slave function units 201 via the coupler CP1 and the optical fiber OPTF2. The master function unit 101B receives uplink optical signals from the respective slave function units 201, without performing processing related to control of the communication line between the master function unit 101B and the respective slave function units 201. The master function unit 101B does not transmit a downlink optical signal to the respective slave function units 201.

For example, when the master function unit 101A has failed, the high-end ECU controls the master function unit 101B to operate as an operational master ECU.

The master function unit 101B may be configured to, as an operational master ECU, transmit a downlink optical signal to the respective slave function units 201 and perform processing related to control of the communication line between the master function unit 101B and the respective slave function units 201. In this case, the high-end ECU (not shown) also controls the master function unit 101B to operate as an operational master ECU, not limited to the case where the master function unit 101A has failed.

The master function unit 101B, for example, acquires information required for a control of the vehicle 1 from the uplink optical signals received from the respective slave function units 201, and performs the control based on the acquired information.

[Modification 7]

In the on-vehicle communication system 301, the master function unit 101 is not necessarily configured to transmit a continuous downlink optical signal, but may be configured to intermittently transmit a downlink optical signal to each slave function unit 201 via the optical fiber OPTF.

More specifically, when the master function unit 101 does not transmit a data frame and a control frame to the slave function units 201, the master function unit 101 halts light emission of the optical transceiver 11.

The master function unit 101 intermittently transmits a downlink optical signal at a somewhat high response speed. Specifically, it is desirable that the master function unit 101 intermittently transmits a downlink optical signal at a time interval of 512 ns to each slave function unit 201.

The master function unit 101 may transmit the downlink optical signal at any time interval such as 1 µs, 10 µs, 100 µs, or 1 ms, as long as the time interval is shorter than a response time during a sleep operation of the slave function unit 201 or a response time of the power supply of the slave function unit 201.

However, the time interval at which the master function unit 101 transmits the downlink optical signal may be substantially the same as the response time during the sleep operation of the slave function unit 201 or the response time of the power supply of the slave function unit 201, as long as the time interval is acceptable in regard to the system design.

In this case, the master function unit 101 and the respective slave function units 201 may use optical signals of the same wavelength.

More specifically, the master function unit 101 transmits, for example, an optical signal having a wavelength of 1310 nm band to each slave function unit 201. Each slave function unit 201 transmits, for example, an optical signal having a wavelength of 1310 nm band to the master function unit 101.

In this case, the master function unit 101 and the respective slave function units 201 transmit the optical signals in a time division manner. Specifically, for example, with reference to FIG. 1, in a certain communication cycle, the master function unit 101 transmits a downlink optical signal for 2 ms to the respective slave function units 201. Next, the cameras 201E, 201F transmit uplink optical signals in this order, each for 2 ms, to the master function unit 101, and the LiDARs 201A, 201B, 201C, and 201D transmit uplink optical signals in this order, each for 2 ms, to the master function unit 101. Thereafter, in the next communication cycle, the master function unit 101 transmits a downlink optical signal for 2 ms to the respective slave function units 201.

In the on-vehicle communication system according to the present embodiment, the controller 20 determines the content of bandwidth allocation in the optical fiber OPTF according to the environment around the vehicle 1 and the traveling state of the vehicle 1 which have been determined. However, the present disclosure is not limited thereto. The controller 20 may determine the content of bandwidth allocation in the optical fiber OPTF according to one of the environment around the vehicle 1 and the traveling state of the vehicle 1.

In the on-vehicle communication system according to the present embodiment, the master function unit 101 dynamically or fixedly allocates a temporal uplink bandwidth in the communication line to each slave function unit 201. However, the present disclosure is not limited thereto. The master function unit 101 may dynamically or fixedly allocate, to each slave function unit 201, a wavelength, a frequency, a space, or a spread code instead of the uplink bandwidth in the communication line.

Meanwhile, the data traffic in vehicles tends to significantly increase. It is desired to deal with the increasing data traffic in vehicles, and realize excellent efficiency.

In the on-vehicle communication system according to the present embodiment, the plurality of slave function units 201 are able to transmit uplink communication signals to the master function unit 101 via at least the common optical fiber OPTF.

This configuration allows the optical fiber connected to the master function unit 101 to be shared, and reduces the number of optical fibers and optical transceivers to be used. In addition, for example, when the slave function units 201 are periodically operated, the optical fiber OPTF can be shared by the slave function units 201, whereby efficient data communication and effective use of resources can be realized.

Therefore, the on-vehicle communication system according to the present embodiment can deal with an increase in the data traffic in a vehicle, and realize excellent efficiency.

In the on-vehicle communication system according to the present embodiment, the slave function units 201 are able to transmit uplink communication signals of different rates.

This configuration allows optical transceivers of appropriate rates to be used according to the kinds or the like of the slave function units 201. Therefore, when a low-speed optical transceiver is used for a slave function unit 201 that does not need high-speed data communication, the cost of the slave function unit 201 can be reduced.

In the on-vehicle communication system according to the present embodiment, the master function unit 102 fixedly allocates a bandwidth in the optical fiber OPTF to each slave function unit 201.

Thus, focusing on the fact that the system configurations of the master function unit 102 and the slave function units 201 are fixed in the vehicle, timings to transmit optical signals from the slave function units 201 to the master function unit 102, the amounts of data to be transmitted, etc., are fixedly set by the master function unit 102, whereby efficient optical communication in the vehicle can be realized with a simpler configuration.

In the on-vehicle communication system according to the present embodiment, the master function unit 102 determines the content of bandwidth allocation according to the environment around the vehicle 1.

According to this configuration, since visibility of a camera degrades during the nighttime, the bandwidth allocated to a sensor other than the camera is increased. Thus, more appropriate bandwidth allocation can be realized while considering the priority levels of the slave function units 201 according to the environment around the vehicle 1.

In the on-vehicle communication system according to the present embodiment, the master function unit 102 determines the content of bandwidth allocation according to the traveling state of the vehicle 1.

For example, when the vehicle 1 travels on an expressway, frequency of parking/stopping is reduced and therefore the necessity of comprehending the environment around the vehicle 1 is reduced. In this case, according to the above configuration, for example, the bandwidth allocated to LiDAR is decreased while the bandwidth allocated to a camera is increased. Thus, more appropriate bandwidth allocation can be realized while considering the priority levels of the slave function units 201 according to the traveling state of the vehicle 1.

In the on-vehicle communication system according to the present embodiment, the master function unit 101 dynamically allocates bandwidths in the optical fiber OPTF to the respective slave function units 201.

Thus, the master function unit 101 performs bandwidth allocation in response to, for example, requests from the slave function units 201, whereby more appropriate bandwidth allocation can be realized.

In the on-vehicle communication system according to the present embodiment, the master function unit 101 is able to transmit a downlink communication signal to each slave function unit 201 via the optical fiber OPTF, and the rate of an uplink communication signal transmitted from the slave function unit 201 is greater than the rate of the downlink communication signal transmitted from the master function unit 101.

In the vehicle, the amount of data transmitted from the master function unit 101 to a slave function unit 201 is smaller than the amount of data transmitted from the slave function unit 201 to the master function unit 101 in many cases. Since the above configuration allows a low-speed optical transceiver to be used as the transmission optical transceiver 11 of the master function unit 101, cost reduction can be achieved.

In the on-vehicle communication system according to the present embodiment, the master function unit 103 does not transmit a communication signal to the slave function units 201 via the optical fiber OPTF.

Thus, data is transmitted by using an electric signal from the master function unit 103 to the slave function units 201, whereby components for optical communication from the master function unit 103 to the slave function units 201 are reduced, resulting in cost reduction. In addition, the cable length of the optical fiber in the vehicle is fixed. Therefore, when the master function unit 103 is caused to store a signal delay time corresponding to the cable length in advance, it is possible to dispense with, for example, measurement of a time (RTT: Round Trip Time) required for data to be reciprocated between the master function unit 103 and a slave function unit 201.

The on-vehicle communication system according to the present embodiment includes a plurality of master function units 101. The slave function units 201 are able to transmit uplink communication signals to each master function unit 101 via at least a common optical fiber OPTF provided for each master function unit 101.

In the configuration having the plurality of master function units 101, for example, even when one of the master function units 101 has failed, another master function unit 101 can substitute for the failed master function unit 101, thereby enhancing the reliability of the on-vehicle communication system.

In the on-vehicle communication system according to the present embodiment, the master function unit 101 is able to intermittently transmit a downlink communication signal to each slave function unit 201 via the optical fiber OPTF.

This configuration allows the optical transceiver 11 to intermittently emit light during a time period when data needs to be transmitted, thereby reducing power consumption.

In the on-vehicle communication system according to the present embodiment, the master function unit 101 is able to transmit a downlink communication signal to each slave function unit 201 via the optical fiber OPTF. The master function unit 101 and the slave function units 201 use optical signals of the same wavelength.

In this configuration, since the master function unit 101 and the slave function units 201 can share components by using the common optical transceiver 11, cost reduction can be achieved.

The embodiments disclosed herein are merely illustrative and not restrictive in all aspects. The scope of the present invention is defined by the scope of the claims rather than the meaning described above, and is intended to include meaning equivalent to the scope of the claims and all modifications within the scope.

The above description includes the feature in the additional note below.

[Additional Note 1]

An on-vehicle communication system mounted on a vehicle, including:

a master function unit; and a plurality of slave function units, wherein the plurality of slave function units are able to transmit uplink communication signals to the master function unit via at least a common optical fiber, the plurality of slave function units are able to transmit uplink communication signals to the master function unit via a coupler and the optical fiber, and the plurality of slave function units include a LiDAR or a camera.

REFERENCE SIGNS LIST 1 vehicle
11 optical transceiver 12 uplink reception processing unit
15 vehicle control unit
18 downlink transmission processing unit
19 DBA processing unit
20 controller
22 memory
31 receiver
32 transmitter
41 CDR
42 deserializer
43 MAC processing unit
44 serializer
51 10G/1G optical reception circuit
52 10G optical transmission circuit
53 1G optical transmission circuit
54 10G optical reception circuit
55 1G optical reception circuit
61 CAN bus
101, 102, 103 master function unit
201 slave function unit
301, 302, 303, 304 on-vehicle communication system

The invention claimed is:

1. An on-vehicle communication system mounted on a vehicle, comprising:
a master function unit; and
a plurality of slave function units including a sensor, wherein
the plurality of slave function units are able to transmit uplink communication signals to the master function unit via at least a common optical fiber,
the master function unit fixedly allocates bandwidths in the optical fiber to the respective slave function units, and
the master function unit determines a content of allocation of the bandwidths according to environment around the vehicle.

2. The on-vehicle communication system according to claim 1, wherein the plurality of slave function units are able to transmit the uplink communication signals of different rates.

3. The on-vehicle communication system according to claim 1, wherein the master function unit determines a content of allocation of the bandwidths according to a traveling state of the vehicle.

4. The on-vehicle communication system according to claim 1, wherein the master function unit dynamically allocates bandwidths in the optical fiber to the respective slave function units.

5. The on-vehicle communication system according to claim 1, wherein
the master function unit is able to transmit a downlink communication signal to each slave function unit via the optical fiber, and
a rate of the uplink communication signal transmitted from the slave function unit is greater than a rate of the downlink communication signal transmitted from the master function unit.

6. The on-vehicle communication system according to claim 1, wherein the master function unit does not transmit a communication signal to each slave function unit via the optical fiber.

7. The on-vehicle communication system according to claim 1, including a plurality of master function units, wherein
the respective slave function units are able to transmit the uplink communication signals to each of the master function units via at least a common optical fiber provided for each master function unit.

8. The on-vehicle communication system according to claim 1, wherein the master function unit is able to intermittently transmit a downlink optical signal to each slave function unit via the optical fiber.

9. The on-vehicle communication system according to claim 8, wherein
the master function unit is able to transmit the downlink communication signal to each slave function unit via the optical fiber, and
the master function unit and the slave function units use optical signals of the same wavelength.

10. The on-vehicle communication system according to claim 1, wherein
the master function unit controls the vehicle based on information obtained from the plurality of slave function units.

* * * * *